Nov. 2, 1948. L. V. UGLOW 2,452,810
SEED POTATO CUTTING MACHINE
Filed May 13, 1947 2 Sheets-Sheet 1
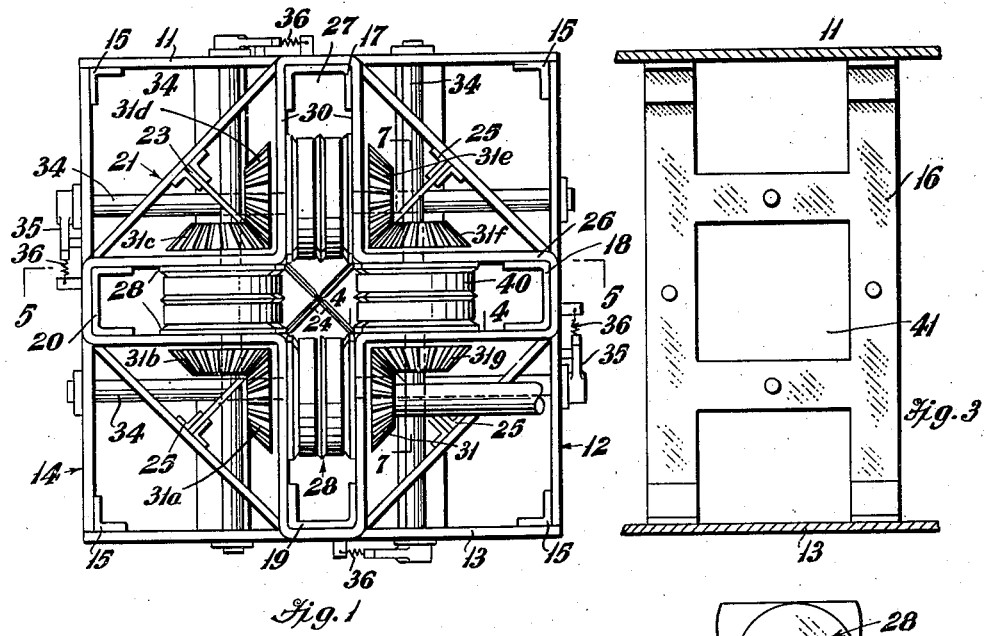
Fig. 1
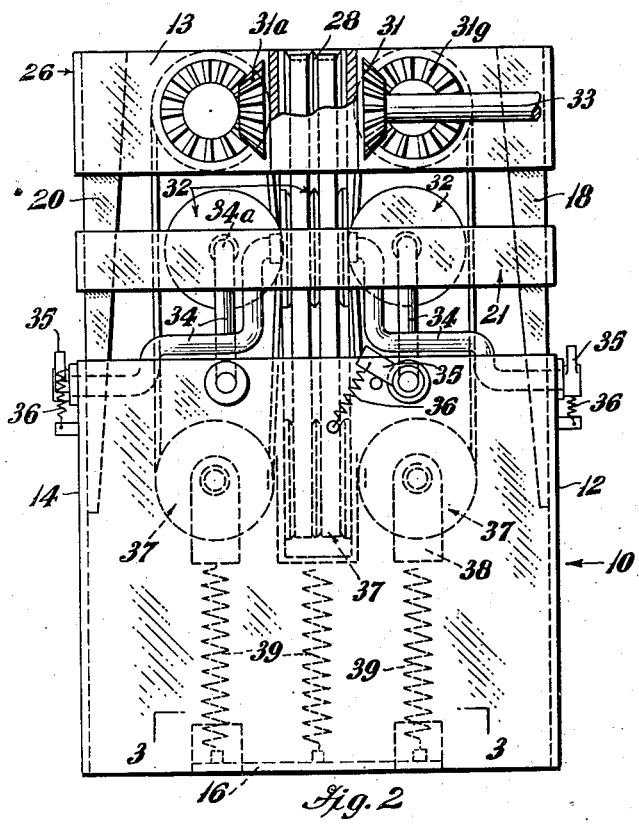
Fig. 2
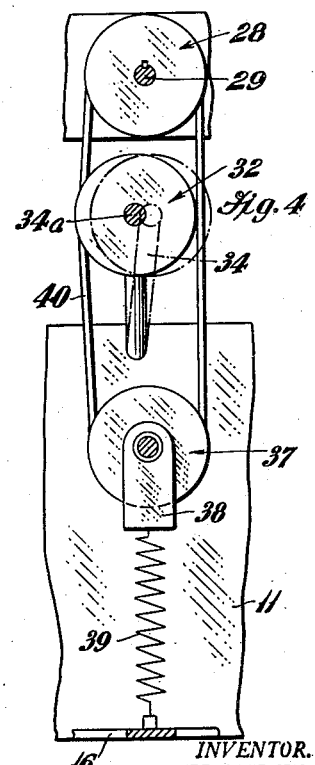
Fig. 3
Fig. 4
INVENTOR.
L. V. UGLOW
BY F. Ledermann
ATTORNEY Nov. 2, 1948.   L. V. UGLOW   2,452,810
SEED POTATO CUTTING MACHINE
Filed May 13, 1947   2 Sheets-Sheet 2
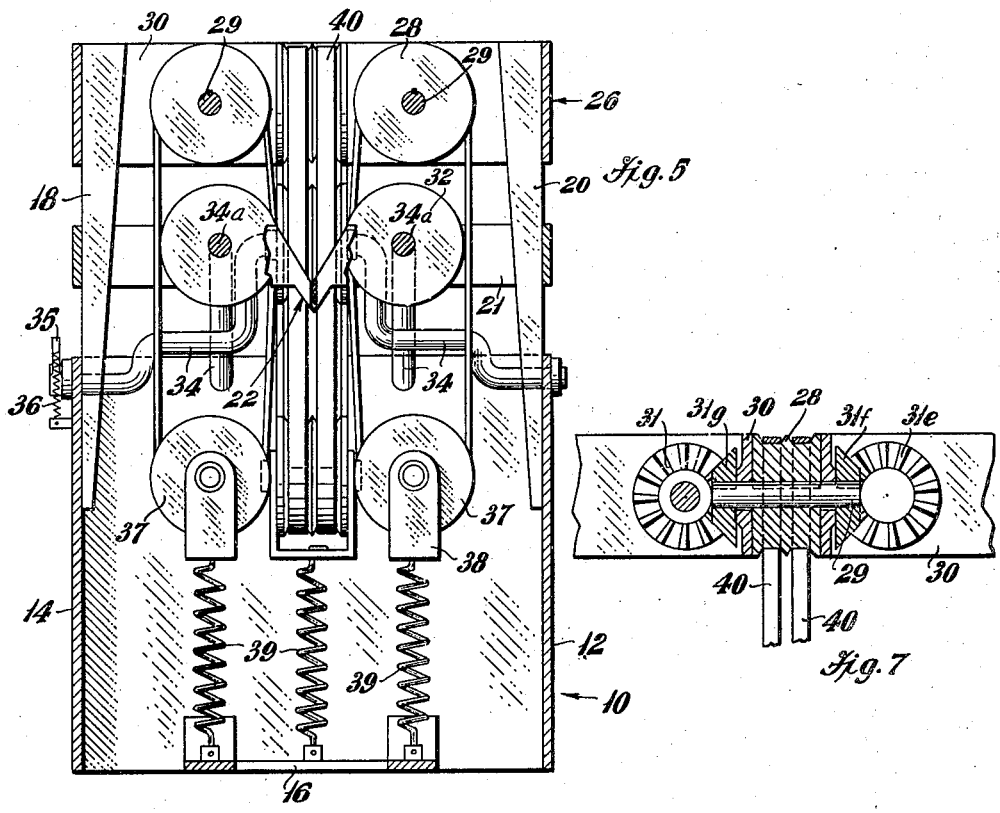
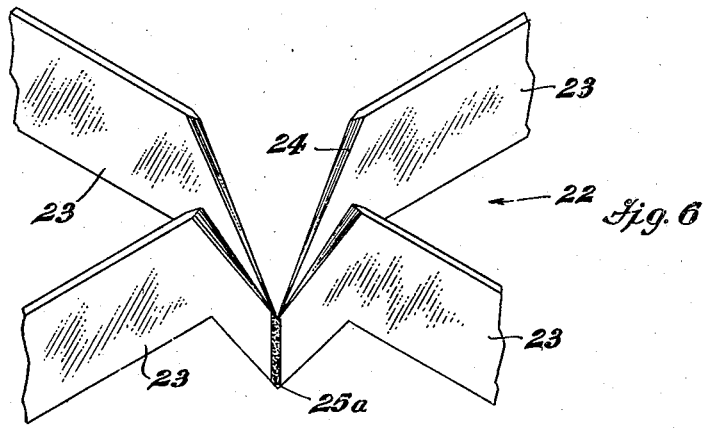
INVENTOR.
L. V. UGLOW
BY J. Ledermann
ATTORNEY Patented Nov. 2, 1948

2,452,810

UNITED STATES PATENT OFFICE 2,452,810

SEED POTATO CUTTING MACHINE

Lenaard V. Uglow, Minatare, Nebr.

Application May 13, 1947, Serial No. 747,761

3 Claims. (Cl. 146—163)

This invention relates to farm machinery in general, and more specifically, aims to provide a power-driven machine for cutting seed potatoes which is efficient, useful, and practical.

Another object of the invention is the provision of a potato-cutting machine which is simple in construction and operation as well as inexpensive in cost of manufacture.

When preparing to plant potatoes, the seed potatoes are normally cut into quarters before planting. To do this by hand is a tedious and inefficient process. Using the device of this invention, one person operating the machine can accomplish the work of several people cutting the seed potatoes by hand.

The above as well as additional and more detailed objects will become apparent in the following description, wherein characters of reference refer to like-numbered parts in the accompanying drawings. It is to be noted that the drawings are intended for the purpose of illustration only and that it is neither desired nor intended to limit the invention to any or all of the specific details of construction shown, excepting insofar as they may be deemed essential to the invention.

Referring briefly to the drawings,

Fig. 1 is a plan view of the seed potato cutter.

Fig. 2 is a fragmentary side elevational view of the device with parts broken away and parts shown in phantom.

Fig. 3 is a sectional view taken on the line 3—3 of Fig. 2.

Fig. 4 is a fragmentary sectional view taken on the line 4—4 of Fig. 1.

Fig. 5 is a sectional view taken on the line 5—5 of Fig. 1.

Fig. 6 is a perspective view of the cutting blades of the device.

Fig. 7 is a fragmentary sectional view taken on the line 7—7 of Fig. 1.

Referring in detail to the drawings, the numeral 10 indicates a substantially rectangular box-like frame of suitable material such as, for instance, metal sheets or plates, comprising upright side walls 11, 12, 13, and 14 rigidly attached to corner uprights 15 forming the corners of the frame 10 and a floor plate 16 substantially of the ladder-shaped conformation shown in Fig. 3, rigidly mounted on the lower edges of the side walls 11 and 12.

Uprights 17, 18, 19, and 20, substantially U-shaped in cross-section are rigidly mounted to the inner sides of the walls 11, 12, 13, and 14, respectively, substantially on the center lines thereof and extend upward above these walls. Intermediate the height of the uprights a substantially hexagonal frame 21 is rigidly mounted. A cutting element 22 comprises four blades 23 disposed cross-fashion, and having their cutting edges 24 positioned in substantially V-shaped conformation each pair of juxtaposed cutting edges forming one arm of a V, the planes of the V's being substantially at right angles to each other and both V's having their apexes at a common point. At the apex of the V's the blades 23 are joined by means of, for instance welding, shown at 25a. The cutting element 22 is mounted on the frame 21 by the rear extremities of the blades 23 registering between angle irons 25, and suitably attached therein as by bolts, or the like.

A third frame 26 having four vertical openings or slots 27 therethrough, in substantially cross-shaped conformation, is rigidly mounted on the uprights 17, 18, 19, and 20 above and in parallel spaced relationship with the frame 21. Each slot 27 has a pair of pulleys 28 rigid on an axle 29 rotatably mounted in and passing through the opposed side walls 30 of the slots 27. On the extremities of the axles 29 and adjacent the outer surface of the side walls 30, bevel gears 31, 31a, 31b, 31c, 31d, 31e, 31f, and 31g are rigidly mounted, each gear meshing with the gear adjacent thereto. One of the axles 29 is provided with an extension 33 integral therewith which is adapted to be connected to and rotated by a power source, not shown.

A second array of four pairs of pulleys 32 identical to the pairs of pulleys 28, are loosely mounted in vertical alignment with the pulleys 28 on the offset axles 34a of crankshafts 34 having their extremities pivotally mounted in the opposed walls 11, 13 and 12, 14, respectively. The pulleys 32 are positioned substantially adjacent the cutting element 22, as shown in Fig. 5, and in the same horizontal plane as the blades 23. A crank arm 35 is rigidly secured to one extremity of each of the crankshafts 34. Coiled springs 36, each having one end connected to the end of a lever 35 and the other end anchored to the frame 10, normally urge the cranks 34 and hence the pulleys 32 inwardly toward the cutting blades.

Below the pulleys 32 and in substantially vertically alignment therewith, a third set of four pairs of pulleys 37 are mounted in yokes 38 which are resiliently connected to the floor plate 16 by means of tension springs 39. Each vertical line of pulleys 28, 32, and 37 is connected by a belt 40 which may be of any suitable material including a resilient material, such as, for instance, rubber.

The outer surface of the belts may be corrugated or roughened, not shown.

Clockwise motion, Figs. 1 and 2, of the drive shaft extension 33 rotates its pulleys 28 and hence drives the belts connecting the pulleys 28 with the pulleys 32 and 37, the inner side of the belt moving in a downward direction. Gears 31 and 31a are rotated on the shaft 29, and mesh with gears 31b and 31, respectively. Gear 31 meshes with and rotates gear 31g which rotates its axle and pulleys and also the gear 31f on the other end of its axle. Gear 31b rotates its axle, pulleys, and gear 31c on the other end of its axle. Gear 31c meshes with and rotates gear 31d and gear 31f meshes with and rotates gear 31e, both gears 31d and 31e combining to rotate their common axle 29 and the pulleys 28 thereon. The belts 40, connecting each vertical line of pulleys, are driven by the pulleys 28 and pass around the pulleys 37. Positioned between the pulleys 28 and 37 are the pulleys 32, as previously described. The belts 40 normally register tangentially in the grooves of the pulleys 32, as these pulleys are urged against the inner sides of the belts by means of the linkage of cranks 34, levers 35, and springs 36, previously described.

In order to use the machine for cutting seed potatoes, the shaft 33 is rotated as stated, thus causing all of the belts 40 to be driven so that the sides of the belts adjacent the center of the machine are moving in a downward direction. The potatoes, not shown, are introduced in single file into the top of the machine in the space between the belts and for this purpose a chute, not shown, might be provided. The potatoes are then singly gripped frictionally between the belts and driven downward past the cutting edges 24, where they are cut into quarters. The cut pieces of the potatoes, not shown, then fall downward and through the space 41 in the floor plate 16 into a container, which may be a sack or box, not shown. Since a continuous supply of potatoes is fed into the machine, cut into quarters, and discharged through the bottom thereof, it is obvious that the machine does the work of several people when cutting the potatoes by hand.

Obviously, modifications in form and structure may be made without departing from the spirit and scope of the invention.

I claim:

1. A machine comprising an upright frame having four opposed walls and a floor, said frame having a horizontal frame member on the top thereof, said top frame member having intersecting vertical openings therethrough in the form of a cross thereby providing four corridor-like slots and a central space between the juxtaposed ends of said slots, each of said slots having a horizontal shaft mounted in the opposed walls thereof and projecting through said walls, the extremities of said shafts having bevel gears rigid thereon, each of said gears being in mesh with the adjacent gear of the adjacent of said shafts, each of said shafts having a pulley rigid thereon between the walls of its said slot, four horizontal crank shafts positioned in a common plane below said top frame member and having their extremities mounted in opposed walls of said frame and positioned substantially in vertical alignment with said first shafts, each of said crank shafts having a single offset crank axle at the center thereof, each of said crank axles having a pulley thereon, resilient means normally positioning said crank axles above said common plane and urging the same inward toward each other, four yokes having the arms thereof extending upward, said yokes being positioned in a common horizontal plane under said first-named horizontal plane and being substantially in vertical alignment with said second-named four pulleys, said yokes having pulleys loosely mounted therein, each of said yokes having a coiled spring secured by one end thereto, the other end of each of said springs being secured to said floor, a belt trained about each of said first-named pulleys and that one of said last-named pulleys in vertical alignment therewith, each of said second-named pulleys being positioned between the sides of one of said belts and by virtue of said resilient means being urged against that side of the belt which is adjacent an imaginary vertical line drawn through the center of said space, said resilient means thereby urging said side of each belt toward said center line, a cross-shaped cutter frame rigidly mounted in said frame between said first-named and said last-named pulleys, one of said first-named shafts having an extension thereon adapted to be rotated to actuate the machine, said extension being adapted to be rotated in such direction that the mutually juxtaposed sides of said belts are moved in a downward direction, and said cutter member having blades thereon positioned under said space.

2. The machine set forth in claim 1, each of said crank shafts having a crank arm on the extremity thereof, said resilient means comprising coiled springs each having one end secured to one of said crank arms and the other end secured to the frame.

3. The machine set forth in claim 1, said floor having an opening therethrough in vertical alignment with said space.

LENAARD V. UGLOW.

REFERENCES CITED

The following references are of record in the file of this patent:

UNITED STATES PATENTS

| Number | Name | Date |
|---|---|---|
| 555,918 | Ayer | Mar. 10, 1896 |
| 1,064,531 | Ott | June 10, 1913 |
| 1,878,423 | Nowlin | Sept. 20, 1932 |
| 1,961,009 | Nachtigal | May 29, 1934 |